JOHN CENKO
INVENTOR

Jan. 31, 1967  J. CENKO  3,301,142

FLUID PRESSURE OPERATED CLUTCH AND VENT VALVE ASSEMBLY

Filed May 24, 1965 2 Sheets-Sheet 2

JOHN CENKO
INVENTOR

BY *John R. Faulkner*
*Donald J. Harrington*
ATTORNEYS

United States Patent Office 3,301,142
Patented Jan. 31, 1967

3,301,142
FLUID PRESSURE OPERATED CLUTCH AND VENT VALVE ASSEMBLY
John Cenko, Plymouth, Mich., assignor to Ford Motor Company, Dearborn, Mich., a corporation of Delaware
Filed May 24, 1965, Ser. No. 458,215
8 Claims. (Cl. 92—172)

My invention relates generally to fluid pressure operated clutch servos, and more particularly to a vent valve assembly for use with a fluid pressure operated friction clutch servo having an annular piston and a cooperating annular cylinder.

Power input portions of friction clutches in an environment of the type with which I now am concerned are connected to a source of driving torque, such as an internal combustion vehicle engine. The power output portions of the clutch can be connected drivably to a power input element of a planetary gear system. The gear system comprises a power output element that is connected to driven portions of an automotive vehicle driveline. Another element of the gear system serves as a reaction point.

By engaging and disengaging the clutch, a torque delivery path from the engine to the power input element of the gear system can be established and disestablished, respectively.

In a preferred embodiment of my invention, the friction clutch with which my improved valve assembly is used forms a portion of a torque delivery path during forward drive operation of the transmission system. During operation in reverse drive, the clutch is disengaged and torque delivery occurs through the gearing system from the engine along a parallel torque delivery path. The annular cylinder of which the clutch forms a part rotates during reverse drive operation. It has been found that, due to the presence of residual fluid in the annular cylinder, a centrifugal pressure build-up occurs within the clutch servo. This tends to engage the forward driving clutch during reverse drive operation, thereby causing a partial clutch engagement and accelerated wear of the associated friction elements.

A centrifugal pressure build-up exists also when the transmission system is conditioned for neutral operation. The clutch is disengaged and the parallel torque delivery path is interrupted at that time. If the engine speed is increased while the transmission is conditioned for neutral operation, the centrifugal pressure build-up in the clutch servo will tend to cause partial engagement of the friction elements of the clutch.

To avoid the adverse influence of a centrifugal pressure build-up, it is common practice to employ a vent valve or a constantly open flow restricting orifice in the working chamber of the clutch servo. The residual fluid in the clutch servo then is exhausted through the flow restricting orifice or through the vent valve when clutch engaging pressure is relieved. The use of a flow restricting orifice that is constantly open has a disadvantage, however, since it expels working fluid during the time that the clutch is engaged. This increases the leakage of the servo and a higher capacity positive displacement pump at the source of fluid pressure then is required. Also, the presence of the orifice delays the rate of application of the clutch. This adversely affects the shift timing during a speed ratio shift.

The vent valves normally used in prior art devices are centrifugally operated. This requires careful calibration since the valves require radial movement of a centrifugally responsive valve element. To make the valves operate with a satisfactory degree of reliability, close manufacturing tolerances must be maintained and each valve assembly must be calibrated so that the shifting movement of the valve element will occur at the right speed. This results in an increased manufacturing cost. Thus the advantages normally associated with vent valves of this type can be enjoyed only by accepting a cost penalty.

It is an object of my invention to provide an improved clutch vent valve for use in an environment of the type above set forth but which avoids the shortcomings mentioned in the foregoing paragraphs.

It is another object of my invention to provide a vent valve for use with a fluid pressure operated clutch servo and which is substantially independent of changes in the centrifugal force acting upon the elements of the valve assembly.

It is a further object of my invention to provide a clutch vent valve for use with a fluid pressure operated clutch servo and which includes simple sheet metal stampings.

It is a further object of my invention to provide a simplified clutch vent valve for use with a fluid pressure operated clutch servo and which comprises a first valve element defining a valve orifice and a second valve element that is adapted to be seated against the orifice in response to a pressure build-up in the clutch chamber. The second valve element assumes an open position by reason of its inherent resiliency when the clutch pressure is relieved.

It is a further object of my invention to provide a clutch vent valve of the type above set forth and which includes a movable, orifice-sealing, disc valve that normally is urged to an orifice opening position by spring elements. These spring elements establish a camming action with the portion of the valve assembly that defines the orifice.

Further objects and features of my invention will become apparent from the following description and from an inspection of the accompanying drawings, wherein.

Figure 1:
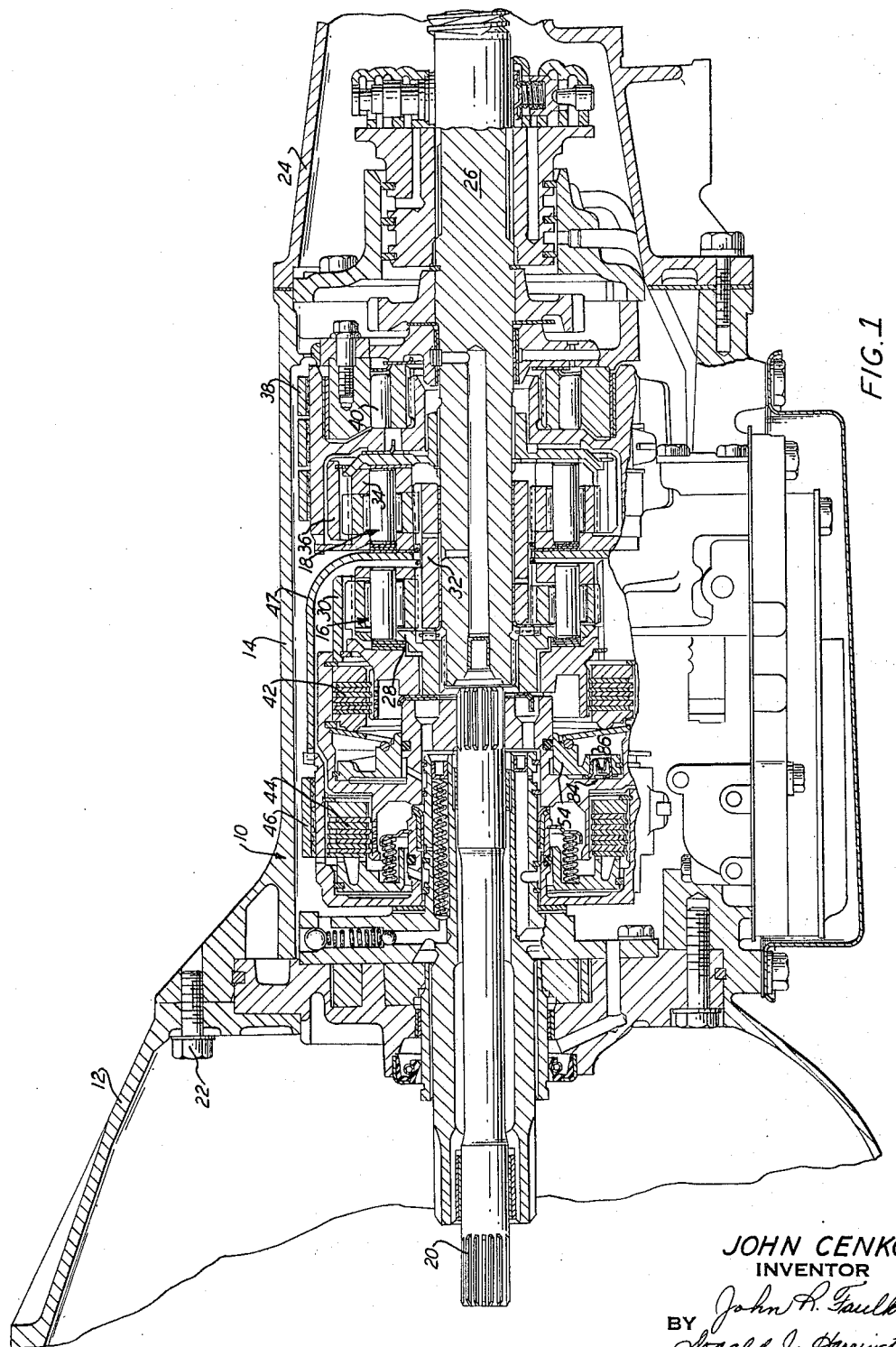
FIGURE 1 shows in cross-sectional form a power transmission gearing arrangement employing the improved clutch structure of my invention.

Shown in FIGURE 1 is a transmission housing 10 which includes a converter housing portion 12 and a main portion 14. The portion 12 encloses a hydrokinetic torque converter unit (not shown) and the portion 14 encloses a pair of planetary gear units 16 and 18. The hydrokinetic torque converter unit includes a bladed impeller, a bladed turbine, and a bladed stator situated in the usual fashion in a common torus circuit. The turbine is connected to a turbine shaft 20 and the impeller is connected to the vehicle engine crankshaft (not shown). The housing portion 12 can be bolted for otherwise secured to the engine block for the internal combustion vehicle engine. The housing portion 14 is secured by bolts 22 to the right-hand end of the housing portion 12. A tailshaft extension housing 24 is bolted or otherwise secured to the right-hand end of the housing portion 14.

The housing portion 24 encloses a power output tailshaft 26 for the transmission system. It can be connected drivably to the vehicle axle assembly by means of a suitable driveshaft.

The planetary gear unit 16 includes a carrier 28, a ring gear 30, and a sun gear 32. The sun gear 32 is common to the planetary gear unit 18. The gear unit 18 includes also a carrier 34 and a ring gear 36. A selectively engageable brake band 38 anchors carrier 34 to prevent rotation in either direction. An overrunning brake 40 also anchors the carrier 34 during low speed ratio forward drive operation. Overrunning brake 40 is incapable, however, of anchoring the carrier during coasting operation.

Turbine shaft 20 is connected to ring gear 30 by means of a forward drive clutch assembly 42. The sun gear 32 is connected selectively, during high speed ratio operation and reverse drive operation, to the shaft 20 by means of a friction clutch assembly 44. A selectively engageable brake band 46 is adapted to anchor sun gear 32, the latter being connected to the drum for brake band 46 by means of a torque delivery shell 48.

Carrier 28 and ring gear 36 each are connected drivably to power output shaft 26.

To establish low speed ratio, forward drive operation, it merely is necessary to engage clutch 42. Turbine torque then is delivered from shaft 20 to the ring gear 30 through the clutch 42. A positive driving torque then is delivered to shaft 26. The torque reaction of sun gear 32 causes the ring gear 36 to rotate in a forward direction. Thus a split torque delivery path is provided through the two simple planetary gear units. Carrier 34, which is anchored by the overrrunning brake 40, serves as a reaction point.

If coast braking is desired as the gearing is conditioned for low speed ratio operation, the brake band 38 can be applied. This brake band, as well as a brake band 46, are applied by fluid pressure operated servos (not shown).

Intermediate speed ratio operation is achieved by applying brake band 46. This anchors sun gear 32, thereby causing carrier 28 to rotate with an increased speed ratio. Overrunning brake 40 freewheels under these conditions. The planetary gear unit 18 is eliminated from the torque delivery path during intermediate speed ratio operation.

High speed ratio direct drive operation is accomplished by disengaging both brake bands and applying simultaneously both clutches 44 and 42. This locks together the sun gear 32 and the ring gear 30 so that the elements of the planetary gearing rotate in unison. The turbine driven shaft 20 distributes torque simultaneously to the ring gear 30 and the sun gear 32.

Reverse drive operation is obtained by engaging brake band 38, releasing brake band 46, releasing clutch 42, and applying clutch 44. Turbine driven shaft 20 then is connected through clutch 44 and through a drive shell 47 to sun gear 32 so that turbine torque is delivered to the gearing. Since the carrier 34 is anchored by brake band 38, ring gear 36 is driven in the reverse direction. Its reverse motion is transferred to the power output shaft 26.

To obtain neutral, both clutches are disengaged. This interrupts the torque delivery path between the shaft 20 and the gearing. The clutch drum for clutch 42 continues to be driven by the turbine shaft 20, however, even when the transmission is conditioned for neutral operation.

Figure 2:
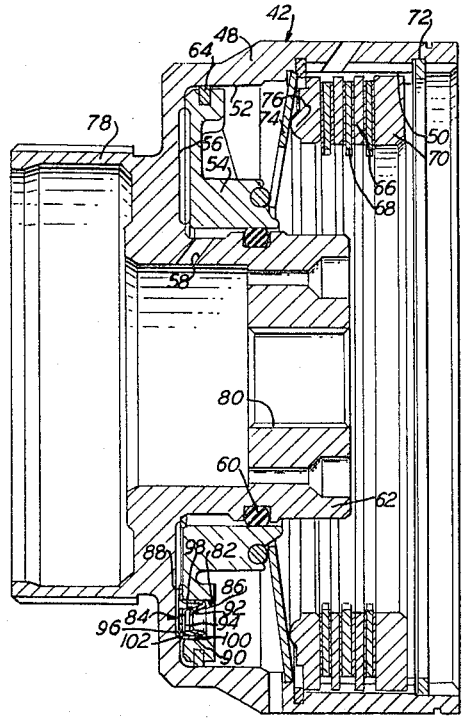
FIGURE 2 is an enlarged view of the clutch structure of FIGURE 1 within which my invention is embodied.

In FIGURE 2, I have illustrated in more particular detail the elements of the clutch 42. The clutch 42 includes a drum 48 which is internally splined as shown at 50. The clutch drum 48 includes an annular cylinder 52 within which is positioned an annular piston 54. The piston 54 and the cylinder 52 cooperate to define a pressure chamber 56 which is in fluid communication with the feed passage 58. A fluid seal 60 is carried in an annular groove formed in the hub 62 of the clutch drum 48. Another seal 64 is situated in a peripheral groove formed in the piston 54.

Discs 66 of the friction clutch 42 are splined to the inner periphery 50 of the drum 48. These discs are situated in interdigital relationship with respect to internally splined discs 68 for the clutch 42. The discs 68 are connected drivably to the ring gear 30 of the planetary gear unit 16 described with reference to FIGURE 1. A clutch pressure reaction ring 70 is carried by the internal splines 50 of the drum 48 and is held axially fast by a snap ring 72.

A Belleville spring washer 74 is engaged at its inner periphery by the piston 54. Spring 74 is anchored at its outer periphery on the internal periphery of the drum 48. A pressure plate 76 carried by the internal splines 50 contacts the spring 74 at a point intermediate the inner and outer peripheries of the spring 74.

The outermost margin of the spring 74 acts as a fulcrum point. The pressure force acting upon the piston 54 creates a pressure force on the pressure plate 76. The spring 74 acts as a leaverage that increases the mechanical advantage. Spring 74 also acts as a return spring for returning the piston 54 to the clutch release position shown.

When pressure is applied to the working chamber 56, the resulting pressure force causes the discs of clutch 42 to engage frictionally, thereby establishing a driving connection between shafts 20 and ring gear 30.

The clutch drum 48 includes an externally splined annular clutch element 78 which carries internally splined discs of the clutch 44. These discs cooperate with externally splined discs carried by internal splines in the brake drum for brake band 46. The hub 62 is internally splined as shown at 80 to permit a splined connection with shaft 20.

Figure 3:
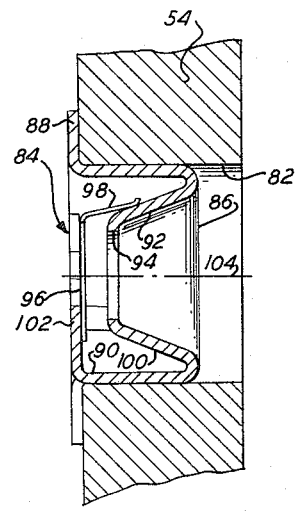
FIGURE 3 is an enlarged view of the valve element used with the servo for the clutch of FIGURE 2.
Figure 4:
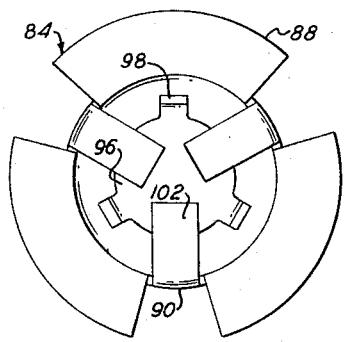
FIGURE 4 is an end view of the valve of FIGURE 3.
Figure 5:
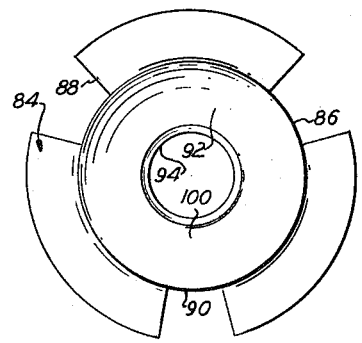
FIGURE 5 is another end view of the valve of FIGURE 3 showing the side opposite to the side shown in FIGURE 4.

Located in the piston 54 at a radially outward location is a vent valve assembly. The assembly is best illustrated in FIGURES 3, 4 and 5. In FIGURE 3 there is shown a bore 82 formed in piston 54. The bore extends from one side of the piston to the other. A valve assembly 84 is situated in the bore 82. It includes a first valve part 86 having a flanged margin 88 and a generally circular body 90. The right-hand end of the member 86, as viewed in FIGURE 3, is in the form of a re-entrant cone-shaped margin 92. Formed in the center of the cone-shaped portion 92 is an opening 94.

A disc valve element 96 is positioned so that it can register with the opening 94. The disc valve 96 may be circular in form. Projecting from the margin of the disc valve 96 are three, equally-spaced, spring fingers 98 which are bent so that they are transverse to the plane of the disc valve element 96. The ends of each of the fingers 98 engage the conical surface 100 of the conical portion 92.

The member 92 is formed with angularly spaced tabs 102 situated generally in the plane of the flange 88. These extend radially inwardly toward the axis 104 of the bore 82. The disc valve element 96 is adapted to be seated against the radially inward ends of the tabs 102 when the valve assembly assumes an opened condition. When the valve element 96 is positioned as shown in FIGURE 3, communication is established between the annular pressure chamber 56 and the exhaust region. The spacing between the margin of the opening 94 and the right-hand surface of the disc valve element 96 is sufficient to establish a slight pressure drop as fluid passes through the opening 94 to the exhaust region.

When pressurized fluid is admitted to the working chamber 56 of the clutch 42, the disc valve element 96 is shifted so that it closes opening 94. This permits a pressure build-up to occur in the clutch servo, thereby allowing the friction discs to become engaged. When fluid pressure is relieved from the pressure chamber 56, the spring fingers 98 of the disc valve element 96 tend to slide over the conical surface 100, thereby urging the disc valve element 96 to the opened position shown in FIGURE 3. The inherent resiliency of the spring fingers 98 normally produces a force acting in a left-hand direction to unseat the disc valve element 96.

Thus, when clutch pressure is relieved, the pressure chamber 56 becomes open to exhaust, thereby allowing the residual fluid to escape through the vent valve assembly. This avoids a subsequent centrifugal pressure build-up. The spring coefficient of the spring fingers 98 and the cone angle of the conical surface 100 can be calibrated, as appropriate, to satisfy any given operating conditions. It may be desirable to provide a preload on the spring fingers 98. It is possible for such a preload to exist since the disc valve element 96 is allowed to become anchored against the tabs 102 when the vent valve assembly is in an opened condition.

Having thus described a preferred form of my invention, what I claim and desire to secure by U.S. Letters Patent is:

1. A vent valve assembly for use with a rotatable fluid pressure operated clutch servo having an annular piston member and an annular cylinder member that cooperate to define an annular pressure chamber, an opening formed in one of said members, a first valve element having a frusto-conical surface positioned at least in part in said opening, a valve opening in said first valve element, a second valve element adapted to register with said valve opening and including a plurality of spring fingers engageable with said frusto-conical surface thereby producing a force component tending to urge said second valve element out of registry with said valve opening, said second valve element being responsive to a pressure build-up in said chamber to move into registry with said valve opening against the opposing influence of said force component.

2. A fluid pressure operated clutch servo having rotatable annular cylinder and annular piston members that cooperate to define an annular pressure chamber, an opening formed in one of said members at a radially outward location relative to the axis of rotation of said members, a vent valve assembly comprising a first valve member situated in said opening, said first valve member including a frusto-conical portion, a valve opening formed in said frusto-conical portion, a second valve member adapted to register with said valve opening and to seal the same in response to a pressure build-up in said pressure chamber, spring means carried by said second valve element including spring fingers engageable with said frustro-conical portion for normally urging said second valve element out of registry with said valve opening, and a stop carried by said one servo member in the path of movement of said second valve element for limiting the movement of said second valve element under the influence of the valve releasing force of said spring fingers thereby providing a flow restricting fluid flow passage from said pressure chamber on one side of said one member to a low pressure region on the other side of said one member.

3. A vent valve assembly for use with a rotatable fluid pressure operated clutch servo having an annular piston member and an annular cylinder member that cooperate to define an annular pressure chamber, an opening formed in one of said members, a first valve element having a frusto-conical surface positioned at least in part in said opening, a valve opening in said first valve element, a second valve element adapted to register with said valve opening, said second valve element being responsive to a pressure build-up in said chamber to move into registry with said valve opening, said second valve element being in the form of a disc that is adapted to be shifted in a direction perpendicular to the plane of its surface, and spring fingers carried by the margin of said disc and engageable with said surface, said spring fingers being urged radially outwardly as said disc valve is moved into registry with said valve opening upon a pressure build-up in said pressure chamber.

4. A fluid pressure operated clutch servo having rotatable annular cylinder and annular piston members that cooperate to define an annular pressure chamber, an opening formed in one of said members at a radially outward location relative to the axis of rotation of said members, a vent valve assembly comprising a first valve member situated in said opening, said first valve member including a frustro-conical portion, a valve opening formed in said frustro-conical portion, a second valve member adapted to register with said valve opening and to seal the same in response to a pressure build-up in said pressure chamber, spring means carried by said second valve element including spring fingers engageable with said frustro-conical portion for normally urging said second valve element out of registry with said valve opening, and a stop carried by said one servo member in the path of movement of said second valve element for limiting the movement of said second valve element under the influence of the valve releasing force of said spring fingers thereby porviding a flow restricting fluid flow passage from said pressure chamber on one side of said one member to a low pressure region on the other side of said one member, said second valve element being in the form of a disc that is adapted to be shifted in a direction perpendicular to the plane of said disc, said spring fingers being urged radially outwardly as said disc valve is moved into registry with said valve opening upon a pressure build-up in said pressure chamber.

5. A vent valve assembly for use with a rotatable fluid pressure operated clutch servo having an annular piston member and an annular cylinder member that cooperate to define an annular pressure chamber, an opening formed in one of said members, a first valve element positioned at least in part in said opening, a valve opening in said first valve element, and a second valve element adapted to register with said valve opening and including a plurality of spring elements engageable with said first valve element thereby producing a force component tending to urge said second valve element out of registry with said valve opening, said second valve element being responsive to a pressure build-up in said chamber to move into registry with said valve opening against the opposing influence of said force component, said first valve member comprising a circular body situated within the opening in said one member, said opening extending axially in a direction parallel to the axis of rotation of said members, one end of said body being deformed to define a re-entrant margin in the form of a frustro-conical section that is integral with said body and engaged by said spring elements, the base of said frustro-conical section being situated remotely from said pressure chamber with respect to the top of said frustro-conical section.

6. A fluid pressure operated clutch servo having rotatable annular cylinder and annular piston members that cooperate to define an annular pressure chamber, an opening formed in one of said members at a radially outward location relative to the axis of rotation of said members, a vent valve assembly comprising a first valve member situated in said opening, said first valve member including a frustro-conical portion, a valve opening formed in said frustro-conical portion, a second valve member adapted to register with said valve opening and to seal the same in response to a pressure build-up in said pressure chamber, spring means carried by said second valve element for normally urging said second valve element out of registry with said valve opening, and a stop carried by said one servo member in the path of movement of said second valve element for limiting the movement of said second valve element under the influence of the valve releasing force of said spring fingers thereby providing a flow restricting fluid flow passage from said pressure chamber on one side of said one member to a low pressure region on the other side of said one member, said first valve member comprising a circular body situated within the opening in said one member, said opening extending axially in a direction parallel to the axis of rotation of said members, one end of said body being deformed to define a re-entrant margin in the form of a frustro-conical section that is integral with said body and engaged by said spring means, the base of said frustro-conical section being situated remotely from said pressure chamber with respect to the top of said frustro-conical section.

7. A vent valve assembly for use with a rotatable fluid pressure operated clutch servo having an annular piston member and an annular cylinder member that cooperate to define an annular pressure chamber, an opening formed in one of said members, a first valve element positioned at least in part in said opening, a valve opening in said first valve element, a second valve element adapted to register with said valve opening and including a plurality of spring elements engageable with said first valve element thereby producing a force component tending to urge said second valve element out of registry with said valve opening, said second valve element being responsive to a pressure build-up in said chamber to move into registry with said valve opening against the opposing influence of said force component, said first valve member comprising a circular body situated within the opening in said one member, said opening extending axially in a direction parallel to the axis of rotation of said members, one end of said body being deformed to define a re-entrant margin in the form of a frustro-conical section that is integral with said body and engaged by said spring elements, the base of said frustro-conical section being situated remotely from said pressure chamber with respect to the top of said frustro-conical section, and means for limiting the shifting movement of said second valve element when it is moved out of registry with said valve opening whereby a fluid flow restricting passage is established between said pressure chamber and a low pressure exhaust region.

8. A fluid pressure operated clutch servo having rotatable annular cylinder and annular piston members which cooperate to define an annular pressure chamber, an opening formed in one of said members at a radially outward location relative to the axis of rotation of said members, a vent valve assembly comprising a first valve member situated in said opening, said first valve member including a frustro-conical portion, a valve opening formed in said frustro-conical portion, a second valve member situated in said opening, said first valve member to seal the same in response to a pressure build-up in said pressure chamber, spring means carried by said second valve element for normally urging said second valve element out of registry with said valve opening, a stop carried by said one servo member in the path of movement of said second valve element for limiting the movement of said second valve element under the influence of the valve releasing force of said spring fingers thereby providing a flow restricting fluid flow passage from said pressure chamber on one side of said one member to a low pressure region on the other side of said one member, said first valve member comprising a circular body situated within the opening in said one member, said opening extending axially in a direction parallel to the axis of rotation of said members, one end of said body being deformed to define a re-entrant margin in the form of a frustro-conical section that is integral with said body and engaged by said spring means, the base of said frustro-conical section being situated remotely from said pressure chamber with respect to the top of said frusto-conical section, and means for limiting the shifting movement of said second valve element when it is moved out of registry with said valve opening whereby a fluid-flow restricting passage is established between said pressure chamber and a low pressure exhaust region.

References Cited by the Examiner

UNITED STATES PATENTS

| | | |
|---|---|---|
| 2,583,919 | 1/1952 | Wilson. |
| 2,909,256 | 10/1959 | Chung _____ 192—85 |
| 3,010,309 | 11/1961 | Lee _____ 137—717 X |

MARK NEWMAN, *Primary Examiner.*

B. W. WYCHE, *Assistant Examiner.*